(12) United States Patent
Akutsu et al.

(10) Patent No.: US 10,786,979 B2
(45) Date of Patent: Sep. 29, 2020

(54) MULTILAYERED STRUCTURE HAVING A LIQUID LAYER ON THE SURFACE THEREOF

(71) Applicant: TOYO SEIKAN GROUP HOLDINGS, LTD., Tokyo (JP)

(72) Inventors: Yosuke Akutsu, Yokohama (JP); Shinya Iwamoto, Yokohama (JP); Shigetoshi Horiuchi, Yokohama (JP)

(73) Assignee: TOYO SEIKAN GROUP HOLDINGS, LTD., Tokyo (JP)

( * ) Notice: Subject to any disclaimer, the term of this patent is extended or adjusted under 35 U.S.C. 154(b) by 557 days.

(21) Appl. No.: 14/786,178

(22) PCT Filed: May 9, 2014

(86) PCT No.: PCT/JP2014/062426
§ 371 (c)(1),
(2) Date: Oct. 22, 2015

(87) PCT Pub. No.: WO2014/188883
PCT Pub. Date: Nov. 27, 2014

(65) Prior Publication Data
US 2016/0075117 A1  Mar. 17, 2016

(30) Foreign Application Priority Data
May 23, 2013 (JP) .................. 2013-109059

(51) Int. Cl.
*B65D 25/14* (2006.01)
*B32B 27/32* (2006.01)
(Continued)

(52) U.S. Cl.
CPC .............. *B32B 27/32* (2013.01); *B32B 7/02* (2013.01); *B32B 15/08* (2013.01); *B32B 27/08* (2013.01);
(Continued)

(58) Field of Classification Search
CPC ..... B65D 25/14; B32B 15/08; B32B 2255/10; B32B 2255/20; B32B 2255/205;
(Continued)

(56) References Cited

U.S. PATENT DOCUMENTS 3,443,710 A * 5/1969 Hills .................... B65D 1/0223
215/385
3,547,294 A * 12/1970 Williams ............... B65D 23/02
215/12.2
(Continued)

FOREIGN PATENT DOCUMENTS

CN  105142879 A  12/2015
JP  06099481 A * 4/1994
(Continued)

OTHER PUBLICATIONS

Kissin, Yury V. Polyethylene—End-Use Properties and Their Physical Meaning. (pp. 73-81). Hanser Publishers. (Year: 2013).*
(Continued)

*Primary Examiner* — John D Freeman
(74) *Attorney, Agent, or Firm* — Sughrue Mion, PLLC

(57) ABSTRACT

A multilayered structure having a liquid layer (5) on a surface of a plastic underlying layer (3), wherein a liquid diffusion prevention layer (1) is provided on the lower side of the underlying layer (3) to suppress or block a diffusion of a liquid that forms the liquid layer (5), and a covering ratio F of the liquid layer (5) is maintained to be not less than 0.5. With this structure, the surface properties of the liquid layer (5) can be stably maintained over long periods of time.

10 Claims, 1 Drawing Sheet

(51) Int. Cl.
  *B32B 27/18* (2006.01)
  *B32B 27/30* (2006.01)
  *B32B 27/08* (2006.01)
  *B32B 15/08* (2006.01)
  *B32B 27/34* (2006.01)
  *B32B 7/02* (2019.01)

(52) U.S. Cl.
  CPC ............ *B32B 27/18* (2013.01); *B32B 27/306* (2013.01); *B32B 27/325* (2013.01); *B32B 27/34* (2013.01); *B65D 25/14* (2013.01); *B32B 2255/10* (2013.01); *B32B 2255/20* (2013.01); *B32B 2255/205* (2013.01); *B32B 2307/704* (2013.01); *B32B 2307/72* (2013.01); *B32B 2307/7242* (2013.01); *B32B 2307/7244* (2013.01); *B32B 2307/7265* (2013.01); *B32B 2307/746* (2013.01); *B32B 2439/00* (2013.01); *B32B 2439/60* (2013.01)

(58) Field of Classification Search
  CPC ......... B32B 2307/704; B32B 2307/72; B32B 2307/7242; B32B 2307/7244; B32B 2307/7265; B32B 2307/746; B32B 2439/00; B32B 2439/60; B32B 27/08; B32B 27/18; B32B 27/306; B32B 27/32; B32B 27/325; B32B 27/34; B32B 7/02
  See application file for complete search history.

(56) References Cited

U.S. PATENT DOCUMENTS

| | | | | |
|---|---|---|---|---|
| 4,692,379 | A | * | 9/1987 | Keung .................... B32B 27/32 428/349 |
| 5,500,261 | A | * | 3/1996 | Takei .................... B65D 1/0215 428/35.7 |
| 5,811,129 | A | * | 9/1998 | Friedman ............... A61K 8/375 424/535 |
| 5,955,165 | A | * | 9/1999 | Zamora ................ B65D 1/0215 428/36.9 |
| 6,287,700 | B1 | * | 9/2001 | Kong .................... B32B 27/32 428/447 |
| 2002/0187328 | A1 | * | 12/2002 | Murschall ................. C08J 5/18 428/220 |
| 2007/0042145 | A1 | * | 2/2007 | Ohta ...................... B32B 25/08 428/34.5 |
| 2008/0286480 | A1 | * | 11/2008 | Kim ...................... B65D 23/02 427/427.1 |
| 2010/0092621 | A1 | | 4/2010 | Akutsu et al. |
| 2013/0032316 | A1 | | 2/2013 | Dhiman et al. |
| 2013/0034695 | A1 | | 2/2013 | Smith et al. |
| 2013/0126462 | A1 | * | 5/2013 | Georgeson .......... B65D 1/0215 215/12.1 |
| 2013/0251952 | A1 | * | 9/2013 | Smith .................... B65D 23/02 428/161 |
| 2014/0106103 | A1 | | 4/2014 | Arakawa et al. |
| 2014/0309348 | A1 | * | 10/2014 | Akutsu .................. C08L 23/06 524/232 |
| 2015/0041465 | A1 | | 2/2015 | Komatsu et al. |
| 2016/0039557 | A1 | | 2/2016 | Akutsu et al. |

FOREIGN PATENT DOCUMENTS

| | | | | | |
|---|---|---|---|---|---|
| JP | | 6-345903 | A | | 12/1994 |
| JP | | 08113244 | A | * | 5/1996 |
| JP | | 10-129642 | A | | 5/1998 |
| JP | | 2007-284066 | A | | 11/2007 |
| JP | | 2008-222291 | A | | 9/2008 |
| JP | | 2009-214914 | A | | 9/2009 |
| JP | | 2010-189052 | A | | 9/2010 |
| JP | | 2010-214910 | A | | 9/2010 |
| JP | | 2011-251756 | A | | 12/2011 |
| JP | | 2011-255901 | A | | 12/2011 |
| JP | | 2013-010541 | A | | 1/2013 |
| WO | | 2012/100099 | A2 | | 7/2012 |
| WO | WO-2012100099 | A2 | * | 7/2012 | ............ A61L 15/24 |
| WO | | 2013/002073 | A1 | | 1/2013 |
| WO | | 2013/022467 | A2 | | 2/2013 |
| WO | | 2013/054616 | A1 | | 4/2013 |
| WO | | 2013/065735 | A1 | | 5/2013 |
| WO | WO-2013065735 | A1 | * | 5/2013 | ............ C08L 23/06 |

OTHER PUBLICATIONS

Machine translation of JP 06-099481 (Year: 1994).*
Machine translation of JP 08-113244 (Year: 1996).*
Communication dated Jan. 2, 2017, from the European Patent Office in counterpart European Application No. 14801806.2.
Austin Carr, "MIT's Freaky Non-Stick Coating Keeps Ketchup Flowing", Fast Company, May 24, 2012, 4 pgs.
Sushant Anand et al., "Droplet condensation and growth on nanotextured surfaces impregnated with an immiscible liquid", Bulletin of the American Physical Society, APS March Meeting 2012, The American Physical Society, Mar. 1, 2012, Numb, vol. 57, 1pg.
Nancy W. Stauffer et al., "Novel slippery surfaces: Improving steam turbines and ketchup bottles", MIT Energy Initiative, Jun. 20, 2013, 3 pgs.
Michael Nosonovsky, "Slippery when wetted", Nature, Sep. 22, 2011, pp. 412-413, vol. 477, No. 7365.
Tak-Sing Wong et al., "Bioinspired self-repairing slippery surfaces with pressure-stable omniphobicity", Nature, Sep. 22, 2011, pp. 443-447, vol. 477, No. 7365.
International Search Report for PCT/JP2014/062426 dated Jul. 22, 2014.

* cited by examiner

MULTILAYERED STRUCTURE HAVING A LIQUID LAYER ON THE SURFACE THEREOF

CROSS REFERENCE TO RELATED APPLICATIONS

This application is a National Stage of International Application No. PCT/JP2014/062426 filed May 9, 2014, claiming priority based on Japanese Patent Application No. 2013-109059 filed May 23, 2013, the contents of all of which are incorporated herein by reference in their entirety.

TECHNICAL FIELD

This invention relates to a multilayered structure having a liquid layer formed on the surface thereof.

BACKGROUND ART

Plastic materials are easy to form, can be easily formed into a variety of shapes and have, therefore, been widely used in a variety of applications. Specifically, olefin resin bottles of which the inner wall surfaces are formed by using an olefin resin such as low-density polyethylene, have been desirably used as containers for containing viscous slurry-like or paste-like fluid contents such as ketchup and the like from such a standpoint that the contents can be easily squeezed out.

Further, the bottles containing viscous contents are, in many cases, preserved in an inverted state to quickly discharge the contents or to use the contents to the last drop without leaving them in the bottle. It is, therefore, desired that when the bottle is inverted, the viscous content quickly falls down without adhering or staying on the inner wall surface of the bottle.

To satisfy such requirements, for example, a patent document 1 proposes a bottle of a multilayered structure of which the innermost layer is formed of an olefin resin having an MFR (melt flow rate) of not less than 10 g/10 min.

The innermost layer of this multilayered bottle has excellent wettability for the oily content. Therefore, if the bottle is inverted or is tilted, then the oily content such as mayonnaise or the like falls down spreading along the surface of the innermost layer and can be completely discharged without adhering or remaining on the inner wall surface of the bottle (on the surface of the innermost layer).

As for the bottles for containing viscous non-oily contents in which plant fibers are dispersed in water like ketchup, a patent document 2 and a patent document 3 are disclosing polyolefin resin bottles having an innermost layer which is blended with a saturated or unsaturated aliphatic amide as a lubricating agent.

The above patent documents 1 to 3 are all trying to improve slipping property of the plastic containers for the contents based on the chemical compositions of the thermoplastic resin layers forming the inner surfaces of the containers, and are achieving improvements in the slipping property to some extent. However, limitation is imposed on improving the slipping property due to limitation on the kinds of the thermoplastic resins that are used and on the additives, and striking improvement has not been achieved yet.

From the above viewpoints, therefore, the present inventors are proposing plastic containers having a liquid layer formed on the inner surfaces thereof that come in contact with the contents (e.g., JP-A-2012-199236, JP-A-2013-23468 and JP-A-2013-091244).

Namely, upon forming the liquid layer of a liquid immiscible with the contents, the above proposals all have succeeded in very improving the slipping property for the contents as compared to the prior arts and have made it possible to quickly discharge the contents out of the containers by tilting or inverting the containers without permitting the contents to adhere or stay on the inner walls of the containers.

The formed bodies of the structure forming the liquid layer on the inner surfaces thereof are not necessarily limited to those of the shapes of containers but can be applied to the formed bodies of the form of films, too. Upon suitably selecting the kind of the liquid, therefore, properties on the surfaces can be improved to a great extent.

PRIOR ART DOCUMENTS

Patent Documents

Patent document 1: JP-A-2007-284066
Patent document 2: JP-A-2008-222291
Patent document 3: JP-A-2009-214914
Patent document 4: JP-A-6-345903

OUTLINE OF THE INVENTION

Problems that the Invention is to Solve

With the structure having the liquid layer on the surface, however, there remains a problem in that excellent slipping property of the liquid layer and the like property extinguish with the passage of time. For instance, after the passage of several days from the production, properties imparted by the liquid layer are lost to a great extent.

It is, therefore, an object of the present invention to provide a multilayered structure having a liquid layer on the surface thereof and stably maintaining the surface properties of the liquid layer for extended periods of time.

Means for Solving the Problems

Namely, according to the present invention, there is provided a multilayered structure having a liquid layer on a surface of a plastic underlying layer, wherein a liquid diffusion prevention layer is provided on a lower side of the underlying layer to suppress or block a diffusion of a liquid that forms the liquid layer.

Described below are preferred embodiments of the multilayered structure of the present invention.

(1) The liquid layer maintains a covering ratio F of not less than 0.5 as calculated according to the following formula (1), $$F = (\cos\theta - \cos\theta_B)/(\cos\theta_A - \cos\theta_B)$$

wherein $\theta$ is a water contact angle on a surface of the multilayered structure,
$\theta_A$ is a water contact angle on the liquid that is forming the liquid layer, and
$\theta_B$ is a water contact angle on a simple plastic material that is forming the underlying layer.

(2) A gap is not more than 200 μm between the surface of the underlying layer that is in contact with the liquid layer and the liquid diffusion prevention layer.

(3) The liquid diffusion prevention layer is formed of a resin having a density of not less than 1.00 g/cm$^3$ and a glass transition temperature (Tg) of not lower than 35° C. or of a resin having a crystallinity of not less than 0.5.

(4) The liquid diffusion prevention layer is formed of a metal foil or a metal-deposited film, or of an inorganic material such as glass or ceramics.

(5) The underlying layer is formed of a resin having a density of not more than 1.0 g/cm$^3$.

(6) The underlying layer contains a liquid that forms the liquid layer, the liquid serving as a source of feeding the liquid layer.

(7) Between the underlying layer and the liquid diffusion prevention layer, there is, further, provided a liquid diffusion adjusting layer containing a liquid for forming the liquid layer.

(8) When a liquid layer sustenance test is conducted by holding the multilayered structure under the atmospheric pressure, a covering drop ratio ΔF is suppressed to be not more than 40%, the covering drop ratio ΔF being represented by the following formula (2), $$\Delta F=100\times(F_0-F_1)/F_0 \qquad (2)$$

wherein $F_0$ is a covering ratio F of the liquid layer one day after the start of the test, and $F_1$ is a covering ratio F of the liquid layer 14 days after the start of the test.

(9) The liquid forming the liquid layer is an edible oil, a fatty acid triglyceride, a fluorine-containing surfactant or a silicone oil.

(10) The underlying layer is an olefinic resin layer.

(11) The liquid diffusion prevention layer is formed on a plastic base material.

(12) The plastic base material comprises an olefinic resin.

(13) The multilayered structure assumes a container having the liquid layer formed on the inner surface thereof.

(14) The multilayered structure assumes a film.

Effects of the Invention

The multilayered structure of the present invention has a liquid layer formed on the plastic layer (underlying layer), and is capable of exhibiting a variety of surface properties depending on the liquid layer. For instance, if the liquid layer is formed of a fluorine-containing surfactant or an oily liquid such as plant oil, aqueous substances such as water and the like can be effectively prevented from adhering on the surface. Besides, the liquid layer exhibits very improved slipping property for the aqueous substances. Further, if the liquid layer is formed of an oil-repelling liquid, the oily substances are prevented from adhering on the surface. Besides, the liquid layer exhibits improved slipping property for the aqueous substances.

The multilayered structure of the invention, further, has a liquid diffusion prevention layer formed on the lower side of the underlying layer that is holding the liquid layer in order to prevent the diffusion of the liquid that forms the liquid layer. Therefore, the covering ratio F of the liquid layer is effectively suppressed from decreasing with the passage of time. For instance, a drop ratio ΔF of the covering ratio F is suppressed to be not more than 40%. As a result, the liquid layer exhibits its surface properties maintaining stability over extended periods of time (e.g., about one month or longer).

That is, the present inventors have conducted experiments and study extensively about the surface properties exhibited by the liquid layer, and have reached the conclusion that a decrease in the surface properties with the passage of time is caused primarily by the liquid constituting the liquid layer that diffuses inward. For instance, a decrease in the surface properties of the liquid layer with the passage of time can be attributed to an extinction of the liquid layer as a result of volatilization of the liquid. However, if the volatilization is a cause of decrease, then the liquid layer may be formed by using a nonvolatile liquid that has a high vapor pressure under the atmospheric pressure. This would effectively suppress the liquid layer from extinguishing and, therefore, would effectively suppress a decrease in the surface properties with the passage of time. In fact, however, forming the liquid layer by using the nonvolatile liquid is not enough for suppressing a decrease in the surface properties with the passage of time. Namely, the surface covering ratio F of the liquid layer decreases with the passage of time. After about 5 days from the formation of the liquid layer, the initial covering ratio F greatly decreases. For instance, the drop ratio ΔF greatly exceeds 40%. It is, therefore, presumed that a decrease in the surface properties with the passage of time is caused greatly by the liquid forming the liquid layer that permeates and diffuses into the interior of the multilayered structure.

From the above viewpoint, the present invention provides a liquid diffusion prevention layer on the lower side of the underlying layer that holds the liquid layer to prevent the diffusion of the liquid that forms the liquid layer. This effectively prevents the liquid from permeating or diffusing into the interior of the multilayered structure and, therefore, effectively prevents the surface properties from decreasing with the passage of time that is caused by a decrease in the covering ratio F of the liquid layer.

For example, as demonstrated later in Examples, the multilayered structure having the liquid diffusion prevention layer formed on the lower side of the underlying layer according to the present invention exhibits a drop ratio ΔF in the covering ratio F of not more than 40% in the liquid layer sustenance testing conducted under the atmospheric pressure not only after the liquid layer was just formed but also after the passage of long periods of time from the formation of the liquid layer. It is, therefore, learned that the surface properties are effectively prevented from decreasing with the passage of time.

According to the present invention, therefore, upon selecting the liquid that forms the liquid layer depending on the form of the multilayered structure, the surface properties dependent on the kind of the liquid can be exhibited maintaining stability over extended periods of time. When the multilayered structure is employed for the packing materials, too, the surface properties are exhibited maintaining stability for as long as the preservation period (shelf life) of the products, i.e., for as long as till the expiration dates. The multilayered structure of the present invention is very useful as a packing material for the products having expiration dates of, for example, 30 days, 60 days, 180 days, 360 days, 720 days, etc.

BEST MODES FOR CARRYING OUT THE INVENTION

<Layer Constitution of the Multilayered Structure>

Figure 1:
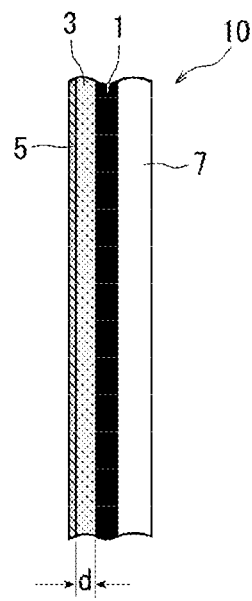
FIG. 1: A sectional view schematically illustrating a layer constitution of a multilayered structure of the present invention.

FIG. 1 illustrates a layer constitution of the multilayered structure of the present invention. The multilayered structure 10 includes a liquid diffusion prevention layer 1 as the intermediate layer. An underlying layer 3 is formed on the surface of the liquid diffusion prevention layer 1 on one side thereof, and a liquid layer 5 is formed on the underlying layer 3 so as to cover the surface thereof. As required, further, a base member 7 made of a suitable material is formed on the surface of the liquid diffusion prevention layer 1 on the other side thereof depending on the use of the multilayered structure 10.

Liquid Diffusion Prevention Layer 1:

The liquid diffusion prevention layer 1 is for interrupting the permeation or diffusion of the liquid that forms the liquid layer 5. Upon forming this layer, the surface properties imparted by the liquid layer 5 can be stably maintained for extended periods of time.

The liquid layer 5 can be formed by a variety of means (these means will be described later). No matter which means is used to form the liquid layer 5, however, the liquid that forms the liquid layer 5 permeates or diffuses into the multilayered structure 10 passing through the underlying layer 3. Namely, despite the liquid layer 5 is formed by using the liquid of a predetermined amount, the liquid gradually migrates into the multilayered structure 10. Therefore, the amount of the liquid decreases with the passage of time and, as a result, the surface properties imparted by the liquid layer 5 extinguish with the passage of time. According to the present invention, however, permeation or diffusion of the liquid from the liquid layer 5 is interrupted due to the presence of the liquid diffusion prevention layer 1. This effectively suppresses a reduction in the amount of the liquid in the liquid layer 5 and makes it possible to alleviate the loss of surface properties with the passage of time.

There is no particular limitation on the material of the liquid diffusion prevention layer 1 provided it is capable of preventing the liquid from permeating or diffusing from the liquid layer 5. It may be made of an inorganic material such as metal foil, metal-deposited film, glass or ceramics, or may be made of an organic material such as diamond-like carbon (DLC)-deposited film, thermosetting resin or thermoplastic resin. If the liquid diffusion prevention layer 1 is formed by using the inorganic material, however, limitation is imposed on the forming means, and the form of the multilayered structure 10 is limited to films or the like. Usually, therefore, the liquid diffusion prevention layer 1 is desirably formed by using an organic material and, specifically, a thermoplastic resin. This is because, the thermoplastic resin can be excellently formed, poses no limitation on the form of the multilayered structure 10, and can be formed into a container even by, for example, the blow forming.

As the thermoplastic resin for forming the liquid diffusion prevention layer 1, there is used the one having a density of not less than 1.00 g/cm$^3$ and a glass transition temperature (Tg) of not lower than 35° C. or the one having a crystallinity of not less than 0.5. Namely, the thermoplastic resin of this kind is dense and is considered to greatly limit the migration or diffusion of the liquid in the resin effectively suppressing, therefore, the permeation or diffusion of the liquid. For instance, with the resin having a density and a glass transition temperature (Tg) that are lower than the above-mentioned ranges, the liquid diffusion prevention layer becomes such a loose layer as to only weakly limit the migration or diffusion of the liquid making it, therefore, difficult to effectively prevent the permeation or diffusion of the liquid. The resin having a crystallinity of less than 0.5, on the other hand, contains less crystalline component for limiting the migration or diffusion of the liquid in the resin, i.e., limits only weakly the migration or diffusion of the liquid, and makes it difficult to effectively prevent the permeation or diffusion of the liquid.

If compared to the inorganic material such as metal foil, metal-deposited film or glass, the above thermoplastic resin has poor capability for preventing the diffusion of liquid. It is, therefore, necessary that the liquid diffusion prevention layer 1 is formed in a relatively large thickness of, for example, not less than 2 µm and, specifically, in a thickness of 5 to 80 µm. If the thickness is too small, the capability for preventing the diffusion of liquid may become unsatisfactory. Even if the thickness is too large, on the other hand, the multilayered structure 10 becomes unnecessarily thick providing no advantage even in cost. The thickness of the liquid diffusion prevention layer 1 should be adjusted depending on the term in which the required surface properties are to be maintained.

In the present invention, there is no specific limitation on the thermoplastic resin that has the density and the glass transition temperature (Tg) as described above. Usually, however, there are preferably used such gas-barrier resins as ethylene.vinyl alcohol copolymer (saponified product of an ethylene.vinylacetate copolymer), aromatic polyamide and cyclic polyolefin; polyesters such as polyethylene terephthalate and liquid crystal polymer; and polycarbonate. For instance, if the liquid diffusion prevention layer 1 is formed by using such a gas-barrier resin, the liquid diffusion prevention layer 1 can be imparted with a gas shut-off property for preventing the passage of gases such as oxygen, which is very advantageous particularly when the multilayered structure 10 is used in the form of a container enabling the contents therein to be prevented from being oxidized and deteriorated. Specifically, the ethylene vinyl alcohol copolymer exhibits particularly excellent oxygen-barrier property and is most desired.

Preferred examples of the ethylene.vinyl alcohol copolymer are the saponified products of the copolymers obtained by saponifying the ethylene vinyl acetate copolymer having an ethylene content of 20 to 60 mol % and, specifically, 25 to 50 mol % to a saponification degree of not less than 96 mol % and, specifically, not less than 99 mol %. From them, the ethylene.vinyl alcohol copolymer having the density and the glass transition temperature (Tg) lying in the above ranges is selected and is used.

The above-mentioned gas-barrier resins can be used in a single kind. Further, so far as the density and the glass transition temperature (Tg) lie in the above ranges, the gas-barrier resin can be used being blended with a polyolefin such as polyethylene to form the liquid diffusion prevention layer 1 as will be described in Examples appearing later.

Here, if the above gas-barrier resin is used as the liquid diffusion prevention layer 1, it is desired to form an adhesive resin layer (not shown) neighboring the liquid diffusion prevention layer 1 in order to improve adhesion to the underlying layer 3 (or the base member 7) and to prevent delamination. The liquid diffusion prevention layer 1 is thus firmly adhered and fixed to the underlying layer 3 or the base member 7. The adhesive resin used for forming the adhesive resin layer has been known per se. For example, there is used a resin that contains, in the main chain or the side chain thereof, the carbonyl groups (>C=O) in an amount of 1 to 100 meq/100 g of the resin and, specifically, in an amount of 10 to 100 meq/100 g of the resin. Or, concretely, there is used an olefin resin graft-modified with a carboxylic acid such as maleic acid, itaconic acid or fumaric acid or an anhydride thereof, or with an amide or an ester; an ethylene-acrylic acid copolymer; an ionically crosslinked olefic copolymer; or an ethylene-vinyl acetate copolymer. The adhesive resin layer may have a thickness with which a suitable degree of adhesive force is obtained and, usually, has a thickness of 0.5 to 20 µm and, preferably, about 1 to about 8 µm.

If the gas-barrier resin in the form of a film is used as the liquid diffusion prevention layer 1, there can be used, as the adhesive resin without limitation, any resin that has been known and has, usually, been used for dry lamination, anchor coating or as a primer. Namely, as the adhesive resin, there can be used urethane resin, phenol resin, epoxy resin, alkyd resin, melamine resin, acrylic resin, polyester resin, amino resin, fluorine-contained resin, cellulose resin or isocyanate resin. These adhesive resins may be used alone or, as required, being blended together. Further, so far as the close adhesion and wettability to the base material can be maintained, the adhesive resin may be either of the aqueous type or the solvent type. In addition to the above components, it is also allowable to use cure acceleration catalyst, filler, softening agent antiaging agent, silane coupling agent, stabilizer, adhesion accelerator, leveling agent, defoaming agent, plasticizer, inorganic filler, and tackifying resin that are known compositions so far as they do not impair properties of the adhesive. There is no particular limitation on the amount of applying the adhesive so far as it does not impair the applicability or economy. Preferably, however, the adhesive is applied in an amount in a range of 0.01 to 10 µm and, more, preferably, 0.1 to 5.0 µm by, for example, spray coating, dipping or by using a spin coater, bar coater, roll coater or gravure coater.

The adhesive resin, too, has a density, glass transition temperature and crystallinity lying in the above-mentioned ranges and, therefore, can work as the liquid diffusion prevention layer 1. Namely, if the above liquid diffusion prevention layer 1 is formed by using the gas-barrier resin, the total thickness of the layer of the gas-barrier resin and the adhesive resin layer is set to lie in the above-mentioned range (not less than 2 µm and, specifically, about 5 to about 80 µm) so that the function as the liquid diffusion prevention layer 1 can be exhibited to a sufficient degree.

In the present invention, further, it is desired that the liquid diffusion prevention layer 1 is so formed that a distance d thereof from the surface of the underlying layer 3 (from the interface between the underlying layer 3 and the liquid layer 5) is not more than 200 µm and, preferably, not more than 150 µm. If the distance d is too large, though the permeation and diffusion of the liquid can be prevented by the liquid diffusion prevention layer 1, the liquid of the liquid layer 5 could permeate in large amounts into between the surface of the liquid diffusion prevention layer 1 and the underlying layer 3 (corresponds to the underlying layer 3 in FIG. 1). As a result, it becomes difficult to effectively suppress the extinction of the liquid layer 5 with the passage of time.

Underlying Layer 3:

The underlying layer 3 provided on the liquid diffusion prevention layer 1 is for holding the liquid layer 5 that is formed on the surface so that it will not be removed. That is, if the liquid layer 5 is formed directly on the liquid diffusion prevention layer 1, the liquid forming the liquid layer 5 has nowhere to permeate and, therefore, tends to be easily separated away; i.e., it becomes difficult to form the liquid layer 5 maintaining stability and a predetermined covering ratio. Therefore, it becomes necessary to provide the underlying layer 3 and to form the liquid layer 5 thereon.

Thus the underlying layer 5 permits to some extent the permeation of the liquid from the liquid layer 5 and exhibits anchoring effect for the liquid layer 5. As compared to the liquid diffusion prevention layer 1, therefore, the underlying layer is formed of a relatively loose resin, such as a thermoplastic resin having a density of not larger than 1.0 g/cm³.

There is no particular limitation on the thermoplastic resin for forming the underlying layer 5 provided it has a molecular weight large enough for forming the layer and a density that lies within the range described above. Usually, there can be used olefin resin, low-density polyethylene, linear low-density polyethylene, medium- or high-density polyethylene, polypropylene, poly 1-butene or poly 4-methyl-1-pentene. It is also allowable to use a random or block copolymer of α-olefins, such as ethylene, propylene, 1-butene, or 4-methyl-1-pentene. In the invention, a particularly preferred olefin resin for forming the underlying layer 3 is polyethylene or polypropylene, and polyethylene is most desired. Specifically, if the multilayered structure 10 is to be used as a squeeze container for squeezing out the content, it is desired that the underlying layer 3 is formed by using the low-density polyethylene or linear low-density polyethylene.

As will be understood from the foregoing description, further, the underlying layer 3 is so formed that the distance d between the surface thereof (interface to the liquid layer 5) and the liquid diffusion prevention layer 1 is not larger than a predetermined value. To produce a suitable anchoring effect for the liquid layer 5, however, it is desired that the underlying layer 3 has a thickness of at least not less than 5 µm and, specifically, not less than 10 µm.

Though dependent upon the means for forming the liquid layer 5, the surface of the underlying layer 3 (interface to the liquid layer 5) can be formed to assume a suitable degree of ruggedness that permits the liquid of the liquid layer 5 to effectively permeate through in order to effectively prevent the liquid layer 5 from separating away and to hold the liquid layer 5 maintaining stability. That is, the rugged surface of the underlying layer 3 that permits the liquid to effectively permeate through is a surface to which the liquid comes in contact at an angle θ of less than 90 degrees and on where the capillary phenomenon becomes dominant over the gravity.

The range in which the capillary phenomenon remains dominant is called capillary length ($\tau^{-1}$), and is expressed by the following formula, $$\tau^{-1} = \gamma a/\rho g)^{1/2}$$

wherein γa is an interfacial tension between the liquid and the gas (air), ρ is a density of the liquid, and g is the gravitational acceleration.

Namely, the capillary phenomenon becomes dominant (height of the liquid droplets increases) in a range of from a contact line where the liquid droplets, gas and solid (underlying layer 3) come in contact with each other simultaneously to the capillary length ($\tau^{-1}$). As will be understood from the above formula, the capillary length is a constant determined by the liquid irrespective of the material of the underlying layer 3, and is, for example, about 2.7 mm in the case of water. To attain the liquid-permeable rugged surface, therefore, the inner diameter of the dents may be set to be shorter than the capillary length ($\tau^{-1}$). The capillary length differs depending on the kind of the liquid forming the liquid layer 5 but lies in a range of not less than 1 mm in the cases of many liquids. Therefore, the dents having an inner diameter of not more than 1 mm may be distributed over the whole surface of the underlying layer 3. In this case, the depth and pitch of the dents and the density of the dents (number of dents per a unit area) are desirably so set that the amount of the liquid forming the liquid layer 5 is held in an amount in a range of 0.1 to 50 g/m$^2$, preferably, 0.3 to 30 g/m$^2$ and, more preferably, 0.5 to 30 g/m$^2$ though dependent upon the kind of the liquid forming the liquid layer 5.

Specifically, if the liquid layer 5 is formed by spraying or applying the liquid after the underlying layer 3 has been formed, formation of the rugged surface is particularly effective.

Representative examples of the means for forming the rugged surface include mechanical means such as of metal mold, roll transfer and emboss working, and optical means such as photolithography and etching by using a laser beam. It is, further, allowable to form the rugged surface by coating the surface of the underlying layer 3 with fine particles (fine metal oxide particles or fine polymer particles), porous material or crystalline additive, or by mixing the above agent into the resin for forming the underlying layer 3 by the in-mass method.

In the present invention, further, the underlying layer 3 may be blended with the liquid that forms the liquid layer 5 so that the underlying layer 3 serves as a source for supplying the liquid that forms the liquid layer 5. That is, upon mixing the liquid into the underlying layer 3 formed of a resin of a low density that permits the liquid to permeate and diffuse therein to a high degree, it is allowed to form the liquid layer 5 that is described later. The liquid diffusion prevention layer 1 is formed on the other side of the underlying layer 3. Therefore, the liquid mixed in the underlying layer 3 oozes on the surface of the underlying layer 3 and thereby forms the liquid layer 5. As described above, the amount of the liquid mixed into the underlying layer 3 is such that the amount of the liquid that oozes out on the surface to form the liquid layer 5 is in a range of 0.1 to 50 g/m$^2$, preferably, 0.3 to 30 g/m$^2$ and, more preferably, 0.5 to 30 g/m$^2$.

Liquid Layer 5:

The liquid layer 5 is formed on the surface by using a suitable liquid depending on the surface properties that are to be imparted to the multilayered structure. Here, however, the liquid layer 5 is formed by using a nonvolatile liquid that produces a small vapor pressure under the atmospheric pressure, as a matter of course, i.e., by using a high-boiling point liquid having a boiling point of, for example, not lower than 200° C. This is because, if the liquid layer 5 is formed by using a volatile liquid, then the liquid layer 5 easily volatilizes and extinguishes with the passage of time though it may vary depending on the mode of use, or it becomes difficult to form the liquid layer 5.

There can be exemplified a variety of liquids for forming the liquid layer 5 provided that they have high boiling points. Specifically, for imparting water-repelling property and slipping property for the water and hydrophilic substances containing water, there can be representatively exemplified fluorine-contained surfactant, silicone oil, fatty acid triglyceride and various plant oils. As the plant oils, there can be exemplified soybean oil, rape oil, olive oil, rice oil, corn oil, safflower oil, sesame oil, palm oil, castor oil, avocado oil, coconut oil, almond oil, walnut oil, hazel oil and salad oil.

By using the above liquids, the liquid layer 5 is formed in an amount, usually, in a range of 0.1 to 50 g/m$^2$, preferably, 0.3 to 30 g/m$^2$ and, more preferably, 0.5 to 30 g/m$^2$ though it may vary depending on the desired surface properties and the kind of the liquid. If the amount of the liquid is small, the surface properties cannot be imparted to a sufficient degree. If the amount of the liquid is too large, on the other hand, the liquid tends to easily split off, the amount of the liquid varies to a large extent and it becomes difficult to maintain surface properties with stability.

In the present invention, to impart the surface properties by using the liquid stably and evenly, the liquid layer must maintain a covering ratio F of not less than 0.5 and, preferably, not less than 0.6 as calculated according to the following formula (1), $$F=(\cos\theta-\cos\theta_B)/(\cos\theta_A-\cos\theta_B)$$

wherein θ is a water contact angle on a surface of the multilayered structure,

θ$_A$ is a water contact angle on the liquid that is forming the liquid layer 5, and θ$_B$ is a water contact angle on a simple plastic material that is forming the underlying layer 3.

If the water contact angle θ on the surface of the multilayered structure 10 is the same as the water contact angle θ$_A$ on the liquid layer 5, it means that the covering ratio F is 1.0 and the underlying layer 3 as a whole has been covered with the liquid layer 5.

For example, if the covering ratio F is smaller than the above range, the liquid layer 5 is formed in a manner that the liquid is dotted on the surface despite the liquid is present in large amounts, and the surface properties cannot be exhibited to a sufficient degree.

Here, the above formula (1) is obtained by modifying the Cassie-Baxter's formula that expresses the apparent contact angle θ on a composite surface formed of two kinds of components (A, B). This is expressed by the formula, $$\cos\theta = F_A\cos\theta_A + F_B\cos\theta_B$$
$$= F_A\cos\theta_A + (1-F_A)\cos\theta_B$$

wherein F$_A$ is a ratio of the component A and F$_B$ is a ratio of the component B, but F$_A$+F$_B$=1, θ$_A$ is a liquid (water) contact angle on the simple component A, and θ$_B$ is the liquid (water) contact angle on the simple component B.

Base Member 7:

In the invention, the base member 7 formed on the other side of the liquid diffusion prevention layer 1 is not specifically needed but is suitably provided depending on the form of use of the multilayered structure 10.

The material of the base member 7 is selected depending on the form of use of the multilayered structure 10 but is, usually, formed of a variety of plastics or papers, or is comprised of a plurality of layers. For instance, the base member 7 may be formed in a multilayered structure inclusive of a resin layer having the same function as that of the above-mentioned liquid diffusion prevention layer 1, or may include therein a reproduced layer containing scrap resins that generate at the time of forming the multilayered structure 10.

That is, if the multilayered structure 10 is to be used as a squeeze container for squeezing out the content, the base member 7 is formed by using a low-density polyethylene or a linear low-density polyethylene from the standpoint of easy squeeze. In this case, a suitable adhesive resin layer may be provided between the base member 7 and the liquid diffusion prevention layer 1. Or as described above, the base member 7 may include, as an inner layer, a gas-barrier resin layer (which also works as the liquid diffusion prevention layer) or a reproduced layer.

<Other Layer Constitutions of the Multilayered Structure>

Figure 2:
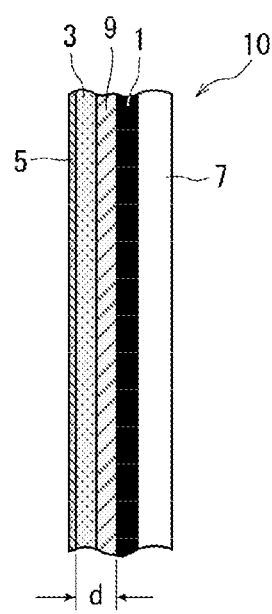
FIG. 2: A sectional view schematically illustrating another layer constitution of the multilayered structure of the present invention.

The multilayered structure of the present invention is not limited to the layer constitution shown in FIG. 1 only but can be provided as shown in FIG. 2 with, for example, a liquid diffusion adjusting layer 9 between the underlying layer 3 and the liquid diffusion prevention layer 1.

The liquid diffusion adjusting layer 9 is characterized by containing the liquid that forms the liquid layer 5. This can be preferably adapted to, for example, an embodiment in which the underlying layer 3 is blended with the liquid that forms the liquid layer 5, and the liquid layer 5 is formed by the liquid that has oozed out from the underlying layer 3. Namely, the liquid in the underlying layer 3 also permeates and diffuses into the liquid diffusion adjusting layer 9 offering advantage in adjusting the amount of the liquid oozing on the surface of the underlying layer 3 to lie in a suitable range, in preventing the liquid from oozing out in excess amounts and, therefore, in forming the liquid layer 5 with the liquid of a suitable amount. Further, this embodiment can also be preferably applied to even a case where the underlying layer 3 is not blended with the liquid for forming the liquid layer 5 but, instead, the liquid layer 5 is formed by being applied onto the surface of the underlying layer 3. That is, if the liquid layer 5 is formed without blending the underlying layer 3 with the liquid that forms the liquid layer 5, the liquid that forms the liquid layer 5 permeates and diffuses into the underlying layer 3 with the passage of time. In this case, for example, upon providing the liquid diffusion adjusting layer 9 between the liquid diffusion prevention layer 1 and the underlying layer 3, the liquid for forming the liquid layer 5 contained in the liquid diffusion adjusting layer 9 undergoes the diffusion into the underlying layer 3 from the liquid diffusion adjusting layer 9. As a result, the liquid permeates and diffuses in decreased amounts from the liquid layer 5 into the underlying layer 3 making it possible to adjust the amount of the liquid of the liquid layer 5.

The resin for forming the liquid diffusion adjusting layer 9 may basically be any resin so far as it contains the liquid for forming the liquid layer 5. For instance, the liquid diffusion adjusting layer 9 can be formed by using a resin having no capability of preventing the diffusion of the liquid. Usually, however, the liquid diffusion adjusting layer 9 should be formed by using the resin of the same kind as the resin that is forming the underlying layer 3.

If the liquid diffusion adjusting layer 9 is provided, too, it is desired that the distance d between the liquid diffusion prevention layer 1 and the surface of the underlying layer 3 lies in the above-mentioned range. Under the condition in which the distance d is maintained in the above range, it is desired that the thickness ratio $t_1/t_2$ of the thickness $t_1$ of the liquid diffusion adjusting layer 9 and the thickness $t_2$ of the underlying layer 3 is set to lie in a range of 0.1 to 10 from the standpoint of exhibiting the function of the liquid diffusion adjusting layer 9 to a sufficient degree.

The above-mentioned liquid diffusion prevention layer 1, underlying layer 3, liquid diffusion adjusting layer 9 and base member 7 may be suitably blended with additives such as antioxidant, surfactant, coloring agent and the like depending on the kinds of materials forming the layers within ranges in which they do not impair the properties of the layers.

In order for the liquid layer 5 to exhibit its surface properties to a sufficient degree, the multilayered structure 10 of the invention having the above-mentioned layer constitution, as described above repetitively, is such that the liquid layer 5 is formed of the liquid in an amount in a range of 0.1 to 50 g/m², preferably, 0.3 to 30 g/m² and, more preferably, 0.5 to 30 g/m² though dependent upon the form and use thereof and that the covering ratio F of the liquid layer 5 as represented by the above-mentioned formula (1) is maintained to be not less than 0.5 and, specifically, not less than 0.6.

In the invention, further, the liquid diffusion prevention layer 1 is provided on the lower side of the underlying layer 5 that is holding the liquid layer 5 and is effectively preventing the liquid layer 5 from extinguishing with the passage of time. Therefore, when the multilayered structure 10 is formed and is tested for sustaining the liquid layer under the atmospheric pressure, the covering drop ratio ΔF expressed by the following formula (2):

$$\Delta F = 100 \times (F_0 - F_1)/F_0 \qquad (2)$$

wherein $F_0$ is a covering factor F of the liquid layer 5 one day after the start of the test, and $F_1$ is a covering ratio F of the liquid layer 5 fourteen days after the start of the test, is suppressed to be not more than 40%, specifically, not more than 20% and, further, not more than 10%. That is, the covering drop ratio ΔF is suppressed as described above not only just after the formation of the liquid layer 5 but also even after the liquid layer sustenance testing was conducted after the passage of a long period of time from when the liquid layer 5 was formed. In the present invention, therefore, the liquid layer 5 is allowed to exhibit surface properties maintaining stability over extended periods of time.

<Form of the Multilayered Structure and Production Thereof>

The multilayered structure 10 of the present invention can assume a variety of forms, and desired surface properties can be exhibited upon selecting a liquid for forming the liquid layer 5 depending on the form of the multilayered structure 10.

For instance, the multilayered structure 10 may be obtained in the form of a film and may be used being stuck to a predetermined place.

In such a case, a removable film such as silicone paper or polyester film is provided, via a suitable adhesive, on the surface of the underlying layer 3 of the multilayered structure 10 or on the back surface of the liquid diffusion prevention layer 1 (or base member 7). Prior to the use, the removable film is removed, and the multilayered structure 10 is so stuck onto the predetermined surface that the surface of the underlying layer 3 is exposed. If the multilayered structure 10 of the invention is used in such a form, the surface properties of the liquid layer 5 can be exhibited at any place. For instance, if a fluorine-contained surfactant is used as the liquid for forming the liquid layer 5 and if the multilayered structure 10 is stuck to a mirror or the like in a bathroom, water droplets do not adhere on the surface of the mirror but quickly flow down; i.e., there is exhibited a function of defogging the mirror.

If the removable film is provided on the surface of the underlying layer 3, the liquid that basically forms the liquid layer 5 remains contained in the underlying layer 3. Upon removing the removable film, therefore, the liquid oozes out on the surface of the underlying layer 3 to thereby form the liquid layer 5.

The multilayered structure 10 of the form of the film described above can be formed by an ordinary method such as casting method, T-die method, calender method or inflation method, i.e., by forming the liquid diffusion prevention layer 1, underlying layer 3 and liquid diffusion adjusting layer 9, as well as a film that serves as the base member 7, and heating and press-adhering them together, or by simultaneously extruding the resins for forming the above layers.

In this case, if the resin that forms the underlying layer 3 is imbibing the liquid that forms the liquid layer 5, there is required no work for forming the liquid layer 5. In other cases, however, the surface of the underlying layer 3 is formed rugged to a suitable degree by means described above and, thereafter, the liquid for forming the liquid layer 5 is applied onto the surface of the underlying layer 3 by spraying, dipping or coating. Thus it is allowed to obtain the multilayered structure 10 of the form of the film provided with the liquid layer 5.

By sticking together two pieces of the multilayered structure 10 of the form of the film, further, it is allowed to obtain a container of the form of a bag.

In the invention, further, it is desired that the multilayered structure 10 is used in the form of a container from the standpoint of utilizing the surface properties of the liquid layer 5 to a sufficient degree. That is, upon forming, on the inner surface of the container (on the surface that comes in contact with the content), the liquid layer 5 by using a liquid that is immiscible with the content contained in the container, it is made possible to prevent the content from adhering on the container wall and to discharge the content quickly and in short periods of time depending on the form of the container.

The form of the container is not specifically limited and may be a cup, bottle, bag (pouch), syringe, jar, tray or a form determined depending on the material of the container, or may be stretched.

For instance, just like the case of producing the multilayered structure 10 of the form of the film, it is also allowable to form a multilayered structure 10 of the form of a container having the liquid layer 5 formed on the inner surface thereof by forming a preform of a layered structure inclusive of the liquid diffusion prevention layer 1, underlying layer 3, base member 7, as well as liquid diffusion adjusting layer 9, subjecting the preform to the vacuum-forming such as plug assist forming or the after-working such as blow-forming to form a container and, further, depending on the form of the container, applying a liquid for forming the liquid layer 5 onto the surface of the underlying layer 3 on the inner surface by such means as spraying or dipping.

If the resin forming the underlying layer 3 is imbibing the liquid for forming the liquid layer 5, it is allowed to omit the work for applying the liquid, as a matter of course. In the case of a blow-formed container, the liquid is supplied at the time of blow forming to form the liquid layer 5 in a small thickness over the whole surface of the underlying layer 3 (inner surface of the container) without irregularity.

The multilayered structure 10 of the invention described above is capable of exhibiting surface properties of the liquid layer 5 to a sufficient degree, and is most suited for as a container for containing, specifically, viscous contents such as ketchup, aqueous paste, honey, various sauces, mayonnaise, mustard, dressing, jam, chocolate syrup, cosmetic liquid such as milky lotion, liquid detergent, shampoo, rinse and the like. That is, with the liquid layer 5 being formed by using a suitable liquid depending on the kind of the content, the content can be quickly discharged by tilting or inverting the container, the content without adhering on the container wall.

For instance, ketchup, various sauces, honey, mayonnaise, mustard, jam, chocolate syrup and milky lotion are hydrophilic substances containing water. As the liquid for forming the liquid layer 5, therefore, there can be preferably used oily liquids that have been approved to be used as food additives, such as silicone oil, glycerin fatty acid ester, edible oil and the like.

EXAMPLES

The invention will now be described by way of Examples.

Described below are a variety of properties, methods of measuring the properties and resins used for forming the multilayered structures (containers) in Examples described below.

1. Measuring the Covering Ratio of the Liquid Layer.

Test pieces each measuring 10 mm×60 mm were cut out from the body portions of the multilayered containers having a capacity of 500 g formed by the methods described later. By using a solid-liquid interface analysis system, DropMaster 700 (manufactured by Kyowa Kaimen Kagaku Co.) under a condition of 23° C. 50% RH, the test pieces were so fixed that the inner layers thereof were facing upward. Pure water of 3 μL was placed on each test piece and was measured for its water contact angle θ. By using the obtained water contact angles, the covering ratio F of the liquid layer on the surface of the multilayered structure was found according to the following formula (1), $$F = (\cos\theta - \cos\theta_B)/(\cos\theta_A - \cos\theta_B)$$

wherein θ is a water contact angle on the surface of the multilayered structure, $\theta_A$ is a water contact angle on the liquid forming the liquid layer, and $\theta_B$ is a water contact angle on the simple plastic material forming the underlying layer.

In finding the covering ratio F of the liquid layer, the following water contact angles were used as the values of $\theta_A$ and $\theta_B$.

$\theta_B$: 100.1° (value on the underlying layer of a simple high-pressure low-density polyethylene (MFR=0.3))

$\theta_A$: 80.3° (value on a medium-chain fatty acid triglyceride (liquid))

2. Testing the Liquid Layer Sustenance and Calculating the Covering Drop Ratio ΔF of the Liquid Layer.

The multilayered containers formed by the methods described later were stored for predetermined periods of time under 22° C. 60% RH (atmospheric pressure). The multilayered containers stored for predetermined periods of time were measured for their covering ratios with the liquid layer.

Specifically, from the covering ratios F of the liquid layer one day after and 14 days after, the covering drop ratios ΔF were found in compliance with the following formula (2), $$\Delta F = 100 \times (F_0 - F_1)/F_0 \quad (2)$$

wherein $F_0$ is a covering ratio F of the liquid layer one day after the start of the test, and $F_1$ is a covering ratio F of the liquid layer 14 days after the start of the test.

Here, the smaller the covering drop ratio ΔF, the larger the sustenance of the liquid layer.

3. Measuring the Slip-Down Speed of the Fluid Contents.

Test pieces measuring 20 mm×70 mm were cut out from the body portions of the multilayered containers of a capacity of 500 g prepared by the methods described later. By using the solid-liquid interface analysis system, DropMaster 700 (manufactured by Kyowa Kaimen Kagaku Co.) under the condition of 23° C. 50% RH, the test pieces were so fixed that the inner layers thereof were facing upward. The fluid content of an amount of 70 mg was placed on each test piece and a slip-down behavior thereof at an inclination of 45° was photographed by using a camera. The slip-down behavior was analyzed, and the slip-down speed was calculated from the plots of moving distances vs. times. The slip-down speed was regarded to be an index of slip-down property. The larger the slip-down speed, the more excellent slipping property is exhibited for the content. There were used the following fluid contents. The contents were, further, measured for their viscosities at 25° C. by using a tuning fork oscillator type viscometer SV-10 (manufactured by A & D Co.).

Fluid content that was used:
  Kewpie-Half
  Produced by Kewpie Co., mayonnaise-like low-calorie food,
    Viscosity=1260 mPa·s.

4. Measuring the Depth-Thickness of the Liquid Diffusion Prevention Layer in the Multilayered Structure and the Whole Thickness Thereof.

By using a polarizing microscope, the multilayered containers formed by the methods described later were observed for their layer constitutions in horizontal cross section of the body portions thereof at a position 50 mm above the bottom of the containers, in an attempt to find the depth•thickness of the liquid diffusion prevention layer in the multilayered structures and the whole thickness thereof. The constitutions were observed at positions of 0°, 90°, 180° and 270° with respect to the cross section, and average values in the four directions were regarded to be the depth-thickness of the liquid diffusion prevention layer in the multilayered structures and the whole thickness thereof.

<Liquid for Forming the Liquid Layer>
  Medium-Chain Fatty Acid Triglyceride (MCT)
  Surface tension: 28.8 mN/m (23° C.)
  Viscosity: 33.8 mPa·s (23° C.)
  Boiling point: 210° C. or higher
  Inflammation point: 242° C. (reference value)

The surface tension of the liquid was a value as measured at 23° C. by using the solid-liquid interface analyzing system DropMaster 700 (manufactured by Kyowa Kaimen Kagaku Co.). Further, the density of the liquid necessary for measuring the surface tension of the liquid was a value as measured at 23° C. by using the density/specific gravity meter DA-130 (manufactured by Kyoto Denshi Kogyo Co.). Further, the viscosity of the lubricating liquid was a value as measured at 23° C. by using the tuning fork type viscometer SV-10 (manufactured by A and D Co.).

<Resin for Forming the Underlying Layer>
  A resin composition (LDPE/MCT=95/5 (wt/wt)) comprising a low-density polyethylene (LDPE) having a density of 0.922 g/cm$^3$ and a crystallinity of 0.37 and a medium-chain fatty acid triglyceride (MCT).

<Resins for Forming the Liquid Diffusion Prevention Layer>
  Ethylene.vinyl alcohol copolymer (EVOH)
  Density, 1.20 g/cm$^3$
  Tg=60° C.
  Poly(m-xylylene adipamide) (MXD6)
  Density, 1.22 g/cm$^3$
  Tg=85° C.
  Ethylene.tetracyclododecene copolymer (COC)
  Density, 1.02 g/cm$^3$
  Tg=80° C.
  High-density polyethylene (HDPE)
  Density, 0.957 g/cm$^3$
  Crystallinity=0.75
  A mixture (EVOH.PO) of ethylene.vinyl alcohol copolymer (EVOH) and polyolefin (PO)
  Density, 1.11 g/cm$^3$ (mixture as a whole)
  Tg=60° C. (EVOH in the mixture)
  EVOH/PO=7/3 (wt/wt)

<Resin for Forming the Adhesive Layers>
  Maleic anhydride-modified polyethylene <Base Members>
  Low-density polyethylene (LDPE)
  Density, 0.922 g/cm$^3$
  Crystallinity=0.37
  Polypropylene (PP)
  Density, 0.900 g/cm$^3$
  Crystallinity=0.34

<Resin for Forming the Outer Layer>
  Low-density polyethylene (LDPE)
  Density, 0.922 g/cm$^3$
  Crystallinity=0.37

<Measuring the Crystallinity of the Resins>
Of the resins that were used, measurement was taken for the low-density polyethylene, high-density polyethylene and polypropylene by using a differential scanning calorimeter (Diamond DSC manufactured by PERKIN ELMER Co.) under the following conditions to find their crystallinities.

Each resin sample of an amount of about 7 mg was scanned from 25° C. up to 200° C. at a heating rate of 10° C./min., held at 200° C. for 3 minutes, scanned from 200° C. down to −50° C. at a cooling rate of 10° C./min., and was held at −50° C. for 3 minutes. Thereafter, the heat of fusion (ΔH) of the resin was found from a profile obtained through the scanning of from −50° C. up to 200° C. at a heating rate of 10° C./min. For the low-density polyethylene and high-density polyethylene, the heat of fusion (ΔH) obtained through the measurement was divided by the heat of fusion (ΔH$^0$)=293 J/g of perfect crystals thereof to calculate the crystallinities.

For the polypropylene, on the other hand, the heat of fusion (ΔH) was divided by the heat of fusion (ΔH$^0$)=207 J/g of perfect crystals thereof to calculate the crystallinity.

Example 1

Into a 40-mm extruder was fed a resin composition comprising a low-density polyethylene (LDPE) and a medium-chain fatty acid triglyceride (MCT) at a ratio of LDPE/MCT=95/5 (wt/wt) as the resin for forming the underlying layer, into a 30-mm extruder A was fed a maleic anhydride-modified polyethylene as the resin for forming the adhesive layer, into a 30-mm extruder B was fed an ethylene-vinyl alcohol copolymer as the resin for forming the liquid diffusion prevention layer, and into a 50-mm extruder was fed a low-density polyethylene as the resin for forming the base member. A molten parison thereof was extruded through a multilayer die head heated at a temperature of 210° C., and was directly blow-formed at a metal mold temperature of 20° C. to prepare a container of a multilayered structure having a capacity of 500 g and weighing 20 g.

The obtained bottle was measured for the covering ratio with the liquid layer, slip-down speed of the fluid content, depth•thickness of the liquid diffusion prevention layer in the multilayered structure, and the whole thickness thereof.

In the stage of one-day period after the formation, it was confirmed from the measured covering ratio with the liquid layer that a liquid layer had been formed on the surface of the formed multilayered structure.

Further, the container that was formed was stored for a predetermined period of time under a condition of 22° C. 60% RH, and was, thereafter, measured for the covering ratio of with the liquid layer (for testing the liquid layer sustenance and calculating the covering drop ratio ΔF of the liquid layer) and the slip-down speed of the fluid content. The results were as collectively shown in Table 1.

The container of the multilayered structure possessed the following layer constitution with the liquid layer as the inner surface.

Liquid layer/underlying layer (100)/adhesive layer (15)/ liquid diffusion prevention layer (20)/adhesive layer (10)/base member (320)

Here, numerals in parentheses represent thicknesses of the layers (unit in microns, the same holds hereinafter).

Examples 2 and 3

Containers of the multilayered structure were prepared by the same procedure as that of Example 1 but changing the thicknesses of the layers. The prepared containers were measured in the same manner as in Example 1. The results were as collectively shown in Table 1.

The containers possessed the following layer constitutions with the liquid layer as the inner surface.

Example 2:
Liquid layer/underlying layer (60)/adhesive layer (10)/ liquid diffusion prevention layer (20)/adhesive layer (10)/base member (320)

Example 3:
Liquid layer/underlying layer (50)/adhesive layer (10)/ liquid diffusion prevention layer (10)/adhesive layer (10)/base member (340)

Example 4

A container of the multilayered structure was prepared by the same procedure as that of Example 1 but feeding, into the 30-mm extruder B, a poly(m-xylylene adipamide) as the resin for forming the liquid diffusion prevention layer and heating the multilayer die head at a temperature of 250° C. The prepared container was measured for its properties. The results were as collectively shown in Table 1.

The containers possessed the following layer constitution with the liquid layer as the inner surface.

Liquid layer/underlying layer (100)/adhesive layer (10)/ liquid diffusion prevention layer (70)/adhesive layer (10)/base member (260)

Example 5

A container of the multilayered structure was prepared by the same procedure as that of Example 1 but feeding, into the 30-mm extruder A, a maleic anhydride-modified polyethylene as the resin for forming the adhesive layer, feeding, into the 30-mm extruder B, a mixture of an ethylene vinyl alcohol copolymer and a polyolefine as the resin for forming the liquid diffusion prevention layer, and feeding, into the 50-mm extruder, a polypropylene as the resin for forming the base member, so as to assume the following layer constitution. The prepared container was measured for its properties. The results were as collectively shown in Table 1.

The container possessed the following layer constitution with the liquid layer as the inner surface.

Liquid layer/underlying layer (100)/adhesive layer (10)/ liquid diffusion prevention layer (50)/adhesive layer (10)/base member (260)

Example 6

A container of the multilayered structure having a capacity of 500 g and weighing 20 g was prepared by feeding, into the 40-mm extruder, a resin composition comprising a low-density polyethylene (LDPE) and a medium-chain fatty acid triglyceride (MCT) at a ratio of LDPE/MCT=95/5 (wt/wt) as the resin for forming the underlying layer, feeding, into the 30-mm extruder B, a mixture of an ethylene vinyl alcohol copolymer and a polyolefin as the resin for forming the liquid diffusion prevention layer, and feeding, into the 50-mm extruder, a low-density polyethylene as the resin for forming the base member, extruding a molten parison through the multilayer die head heated at a temperature of 210° C. and directly blow-forming the parison at a metal mold temperature of 20° C. so as to assume the following layer constitution. The prepared container was measured for its properties. The results were as collectively shown in Table 1.

The container possessed the following layer constitution with the liquid layer as the inner surface.

Liquid layer/underlying layer (90)/liquid diffusion prevention layer (50)/base member (320)

Example 7

A container of the multilayered structure was prepared by the same procedure as that of Example 6 but feeding, into the 30-mm extruder B, a high-density polyethylene as the resin for forming the liquid diffusion prevention layer. The prepared container was measured for its properties. The results were as collectively shown in Table 1.

The container possessed the following layer constitution with the liquid layer as the inner surface.

Liquid layer/underlying layer (90)/liquid diffusion prevention layer (40)/base member (330)

Example 8

A container of the multilayered structure was prepared by the same procedure as that of Example 6 but feeding, into the 30-mm extruder B, an ethylene.tetracyclododecene copolymer as the resin for forming the liquid diffusion prevention layer, so as to assume the following layer constitution. The prepared container was measured for its properties. The results were as collectively shown in Table 1.

The container possessed the following layer constitution with the liquid layer as the inner surface.

Liquid layer/underlying layer (90)/liquid diffusion prevention layer (70)/base member (300)

Comparative Example 1

A container of the multilayered structure having a capacity of 500 g and weighing 20 g was prepared by feeding, into the 40-mm extruder, a resin composition comprising a low-density polyethylene (LDPE) and a medium-chain fatty acid triglyceride (MCT) at a ratio of LDPE/MCT=95/5 (wt/wt) as the resin for forming the underlying layer, feeding, into the 50-mm extruder, a low-density polyethylene as the resin for forming the base member, feeding, into the 30-mm extruder A, a maleic anhydride-modified polyethylene as the resin for forming the adhesive layer, feeding, into the 30-mm extruder B, an ethylene.vinyl alcohol copolymer as the resin for forming the liquid diffusion preventing layer, and feeding, into a 30-mm extruder C, a low-density polyethylene as the resin for forming the outer layer, extruding a molten parison through the multilayer die head heated at a temperature of 210° C. and directly blow-forming the parison at a metal mold temperature of 20° C. The prepared container was measured for its properties. The results were as collectively shown in Table 1.

The container possessed the following layer constitution with the liquid layer as the inner surface.

Liquid layer/underlying layer (90)/base member (210)/ adhesive layer (10)/liquid diffusion prevention layer (20)/adhesive layer (20)/outer layer (50)

the liquid layers one day after the preparation were as high as 0.88 to 1.0, and were still as high as not less than 0.90 five days after the preparation when the covering ratio of the liquid layer has drastically dropped down in Experiment 1. Further, the covering drop ratios ΔF of the liquid layers were not more than 40% (specifically, not more than 10%) effectively preventing a decrease in the covering ratio. From the measured results of the slip-down speed of the fluid content, further, Examples 1 to 8 did not exhibit such a decrease in the slip-down speed with the passage of time that was seen in Comparative Example 1, and maintained high values.

In the multilayered structure having a liquid layer on the surface, therefore, it is learned that provision of the liquid diffusion prevention layer makes it possible to sustain the

TABLE 1

| | Layer constitution | Whole thickness μm | Liquid diffusion prevention layer | | | Covering ratio F | | | | |
|---|---|---|---|---|---|---|---|---|---|---|
| | | | Material | Depth d μm | Thickness μm | 1 Day | 5 Days | 14 Days | 28 Days | 56 Days |
| Ex. 1 | liquid/ | 465 | EVOH | 115 | 20 | 0.88 | 0.90 | 0.90 | 0.86 | 0.84 |
| Ex. 2 | underlayer/adhesive/ | 420 | " | 70 | 20 | 0.88 | — | 0.82 | 0.85 | 0.84 |
| Ex. 3 | diffuse prevent | 420 | " | 60 | 10 | 0.87 | — | 0.84 | 0.85 | 0.84 |
| Ex. 4 | layer/adhesive/base | 450 | MXD6 | 110 | 70 | 1.00 | 0.96 | 0.93 | 0.94 | 0.88 |
| Ex. 5 | | 430 | EVOH•PO | 110 | 50 | 0.93 | 0.93 | 0.89 | 0.87 | 0.95 |
| Ex. 6 | liquid/ | 460 | EVOH•PO | 90 | 50 | 0.96 | 0.92 | 0.92 | 0.83 | 0.86 |
| Ex. 7 | underlayer/ | 460 | HDPE | 90 | 40 | 0.90 | 0.90 | 0.86 | 0.45 | 0.37 |
| Ex. 8 | diffuse prevent layer/base | 460 | COC | 90 | 70 | 0.95 | 0.96 | 0.91 | 0.90 | 0.86 |
| Comp. Ex. 1 | liquid/ underlayer/ base/adhesive/ diffuse prevent layer/adhesive/ outer layer | 400 | EVOH | 310 | 20 | 0.84 | 0.38 | 0.46 | 0.35 | — |

| | Covering drop ratio ΔF % | Slip-down speed (Kewpie-Half) mm/min. | | | | |
|---|---|---|---|---|---|---|
| | | 1 Day | 5 Days | 14 Days | 28 Days | 56 Days |
| Ex. 1 | −2.3 | 6.4 | 10.7 | 7.9 | 5.5 | 6.5 |
| Ex. 2 | 3.4 | 6.8 | — | 13.4 | 7.9 | 8.0 |
| Ex. 3 | 3.4 | 6.4 | — | 8.5 | 7.1 | 6.0 |
| Ex. 4 | 7.0 | 4.3 | 9.1 | 11.3 | 10.4 | 6.4 |
| Ex. 5 | 4.3 | 5.9 | 14.3 | 11.6 | 9.6 | 6.1 |
| Ex. 6 | 4.2 | 9.0 | 13.8 | 12.6 | 9.0 | 7.0 |
| Ex. 7 | 4.4 | 12.5 | 9.6 | 6.7 | 2.1 | 0.8 |
| Ex. 8 | 4.2 | 8.4 | 12.6 | 9.1 | 6.1 | 4.4 |
| Comp. Ex. 1 | 45.2 | 5.1 | 4.1 | 3.3 | 3.3 | — |

From Table 1, it is learned that in Comparative Example 1 in which the liquid diffusion prevention layer was provided on the lower side of the base material (on the side opposite to the liquid layer) at a position of 310 μm deep from the interface of the underlying layer and the liquid layer, the covering ratio F of the liquid layer was as high as 0.84 one day after the preparation. From the results of the liquid layer sustenance test, however, the covering ratio F of the liquid layer was greatly decreasing down to 0.38 five days after the preparation. Further, the covering drop ratio ΔF of the liquid layer was 45.2% which was a drastic decrease in the covering ratio. From the measured results of the slip-down speed of the fluid content, further, the slip-down speed was 5.1 mm/min. one day after the preparation which speed, however, was decreasing with the passage of time.

In Examples 1 to 8 in which the liquid diffusion prevention layer was provided at a position of a depth of not more than 200 μm from the interface of the underlying layer and the liquid layer, on the other hand, the covering ratios F of liquid layer maintaining stability for extended periods of time, the liquid layer exhibiting its surface properties maintaining stability.

DESCRIPTION OF REFERENCE NUMERALS

1: diffusion prevention layer
3: underlying layer
5: liquid layer
7: base member
9: liquid diffusion adjusting layer

The invention claimed is:
1. A multilayered structure having a liquid layer on a surface of a plastic underlying layer, wherein a liquid diffusion prevention layer is provided on a lower side of said plastic underlying layer to suppress or block a diffusion of a liquid that forms said liquid layer, and wherein
   (a) the multilayered structure is a container for containing a water-containing substance,

(b) the plastic underlying layer which lies under the liquid layer is positioned on the inner surface of the container and is formed from a blend of a resin and the liquid that forms the liquid layer, such that the liquid permeates the plastic underlying layer and diffuses to the surface of the plastic underlying layer to form the liquid layer, (c) the liquid that forms the liquid layer works to improve a slipping property for the water-containing substance in the container, and comprises a fluorine-containing surfactant, fatty acid triglyceride or plant oil that is immiscible with the content in the container, (d) a gap is not more than 200 μm between the surface of the plastic underlying layer that is in contact with said liquid layer and said liquid diffusion prevention layer, and (e) said liquid diffusion prevention layer is formed of ethylene vinyl alcohol copolymer, wherein said liquid layer maintains a covering ratio F of not less than 0.5 as calculated according to the following formula (1), $$F=(\cos \theta - \cos \theta_B)/(\cos \theta_A - \cos \theta_B) \quad (1)$$

wherein θ is a water contact angle on a surface of said multilayered structure, $\theta_A$ is a water contact angle on the liquid that is forming said liquid layer, and $\theta_B$ is a water contact angle on the resin that is forming said plastic underlying layer, and when a liquid layer sustenance test is conducted by holding said multilayered structure under atmospheric pressure, the covering drop ratio ΔF is suppressed to be not more than 40%, said covering drop ratio ΔF being represented by the following formula (2), $$\Delta F=100 \times (F_0-F_1)/F_0 \quad (2)$$

wherein $F_0$ is a covering ratio F of said liquid layer one day after the start of the test, and $F_1$ is a covering ratio F of said liquid layer 14 days after the start of the test.

2. The multilayered structure according to claim 1, wherein the resin in said plastic underlying layer has a density of not more than 1.0 g/cm³.

3. The multilayered structure according to claim 1, wherein between said plastic underlying layer and said liquid diffusion prevention layer, there is, further, provided a liquid diffusion adjusting layer containing the liquid that forms said liquid layer.

4. The multilayered structure according to claim 1, wherein said liquid diffusion prevention layer is formed on a plastic base material.

5. The multilayered structure according to claim 4, wherein said plastic base material comprises an olefinic resin.

6. A multilayered structure having a liquid layer on a surface of a plastic underlying layer, wherein a liquid diffusion prevention layer is provided on a lower side of said plastic underlying layer to suppress or block a diffusion of a liquid that forms said liquid layer, and wherein (a) the multilayered structure is a container for containing a water-containing substance, (b) the plastic underlying layer which lies under the liquid layer is positioned on the inner surface of the container and is formed of a blend of either low-density polyethylene or linear low-density polyethylene and the liquid that forms the liquid layer, such that the liquid permeates the plastic underlying layer and diffuses to the surface of the plastic underlying layer to form the liquid layer, (c) the liquid that forms the liquid layer works to improve a slipping property for the water-containing substance in the container, and comprises a fluorine-containing surfactant, fatty acid triglyceride or plant oil that is immiscible with the content in the container, (d) a gap is not more than 200 μm between the surface of the plastic underlying layer that is in contact with said liquid layer and said liquid diffusion prevention layer, and (e) said liquid diffusion prevention layer is formed of a resin having a density of not less than 1.00 g/cm³ and a glass transition temperature (Tg) of not lower than 35° C. or of a resin having a crystallinity of not less than 0.5, wherein said liquid layer maintains a covering ratio F of not less than 0.5 as calculated according to the following formula (1), $$F=(\cos \theta - \cos \theta_B)/(\cos \theta_A - \cos \theta_B) \quad (1)$$

wherein θ is a water contact angle on a surface of said multilayered structure, $\theta_A$ is a water contact angle on the liquid that is forming said liquid layer, and $\theta_B$ is a water contact angle on a resin material that is forming said plastic underlying layer, and when a liquid layer sustenance test is conducted by holding said multilayered structure under atmospheric pressure, the covering drop ratio ΔF is suppressed to be not more than 40%, said covering drop ratio ΔF being represented by the following formula (2), $$\Delta F=100 \times (F_0-F_1)/F_0 \quad (2)$$

wherein $F_0$ is a covering ratio F of said liquid layer one day after the start of the test, and $F_1$ is a covering ratio F of said liquid layer 14 days after the start of the test.

7. The multilayered structure according to claim 6, wherein the low-density polyethylene or linear low-density polyethylene has a density of not more than 1.0 g/cm³.

8. The multilayered structure according to claim 6, wherein between said plastic underlying layer and said liquid diffusion prevention layer, there is, further, provided a liquid diffusion adjusting layer containing the liquid that forms said liquid layer.

9. The multilayered structure according to claim 6, wherein said liquid diffusion prevention layer is formed on a plastic base material.

10. The multilayered structure according to claim 9, wherein said plastic base material comprises an olefinic resin.

* * * * *